Patented Feb. 17, 1931

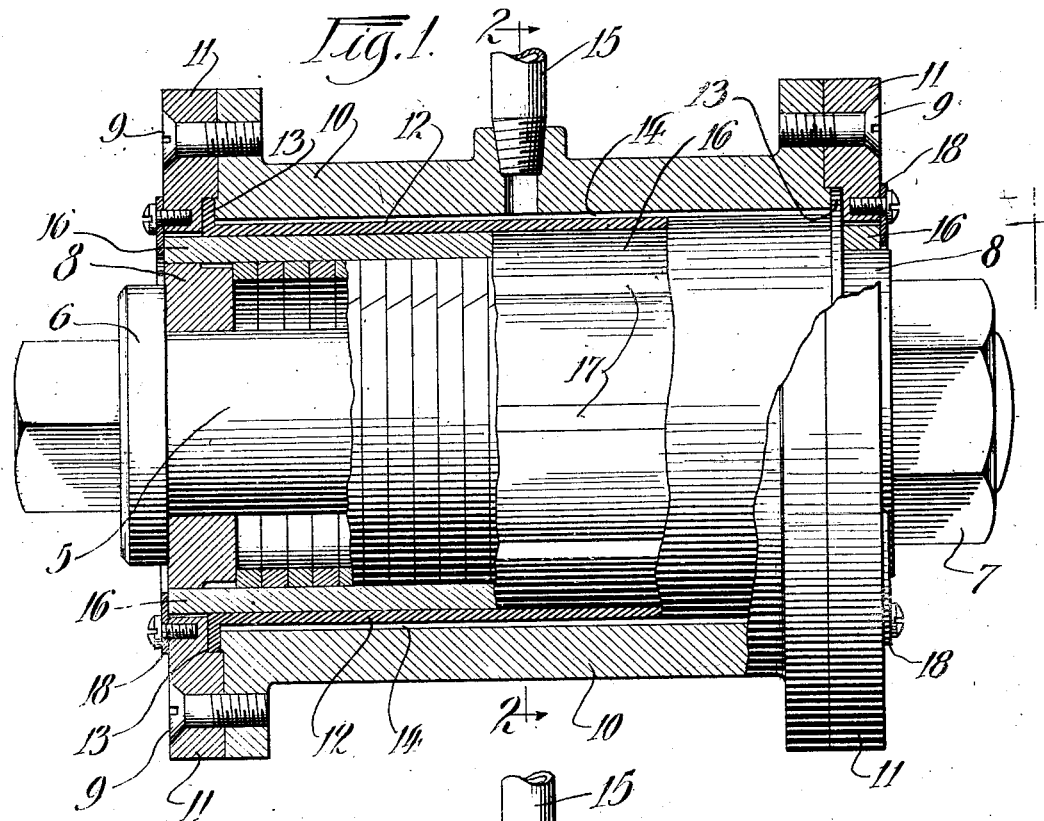
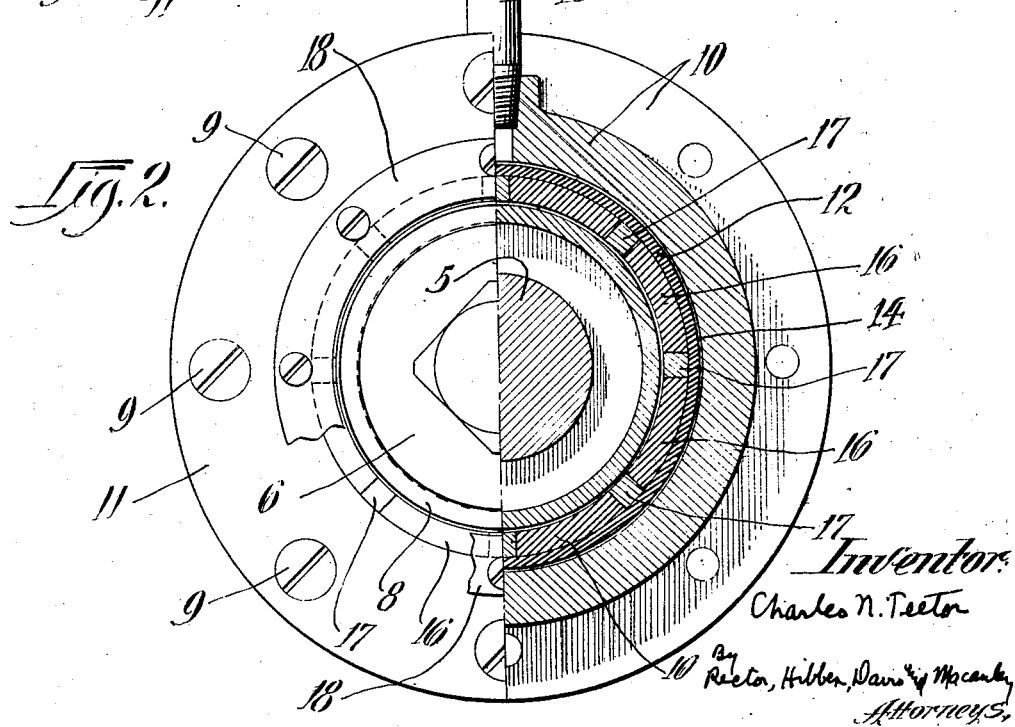

1,793,029

UNITED STATES PATENT OFFICE

CHARLES N. TEETOR, OF HAGERSTOWN, INDIANA, ASSIGNOR TO THE PERFECT CIRCLE COMPANY, OF HAGERSTOWN, INDIANA, A CORPORATION OF INDIANA

PISTON-RING COMPRESSOR

Application filed April 6, 1929. Serial No. 352,949.

My invention relates to a device for compressing circular objects and has special utility for closing split unfinished piston rings in order to prepare them for being turned down or otherwise finished to the desired diameter.

The principal object of my present invention is to improve the structure and operation of the apparatus so as to more accurately center or align the piston rings with respect to each other.

More particularly, my invention contemplates the use of an inflatable tube encircling a tubular-like structure comprising metal bars and interposed strips of rubber or other suitable flexible material, the metal bars being adapted to effect a more accurate lineal or axial alignment of the piston rings with respect to each other, while the interposed rubber strips are free to act upon the individual rings to effect more perfectly the ring closing adjustment.

The above and other objects of my invention will become apparent from the following description taken in conjunction with the accompanying drawings.

In said drawings, Figure 1 in general is a longitudinal section taken through a device embodying my invention, and shows some of the parts partly in section and partly in full, and Fig. 2 shows one-half of the device in end elevation and the other half in transverse section as on the line 2—2 of Fig. 1.

The fixture for supporting the unfinished piston rings includes an arbor 5 with a fixed flange 6 on one end and a removable nut 7 screw-threaded on the other end, and two removable ring-shaped heads 8 which have a snug fit on the arbor. The piston rings, after each has been cut to remove a small section of metal to form the gap, are placed between the rings 8 and the nut 7 is then applied and screwed up just sufficiently to clamp the piston rings therebetween. The rings are then partially closed and centered on the arbor as by separate shell, comprising a cylinder formed in two halves, such as is disclosed in U. S. Patent, No. 1,454,350 to R. R. Teetor. Before removing the rings from this shell the nut is screwed up tighter so as to firmly clamp the ring in their partially contracted condition when the rings, so mounted on the arbor, are inserted in the compressor embodying my present invention and which will now be described.

The other cylindrical casing or shell 10 of my compressor has outwardly extending flanges to which are secured end rings or flanges 11 by means of suitable screws 9. The outwardly turned ends of a flexible tube 12, made preferably of rubber, form radial flanges 13 which are firmly clamped between the rings 11 and the ends of the shell. The tube 12 and shell 10 form a cylinder air chamber 14, the chamber being supplied with air through an air pipe 15 and from an air pump which is not shown.

Positioned within the rubber tube 12 is a tubular structure comprising segmental flexible strips 16 (preferably formed of rubber) and interposed rigid bars 17 (preferably formed of steel) both extending longitudinally the length of the compressor. The tubular structure, comprising the strips 16 and the bars 17, is self-supporting or sustaining, the bars 17 being firmly wedged in between the compressed strips 16 which, when the tube 12 is not inflated, serve to hold the ends of the strips and bars in engagement with the inner peripheries of the rings 11 as illustrated in Fig. 2. Ring-like plates 18 are fastened to each end of the compressor to prevent longitudinal movement of the bars 17 and the strips 16.

After the rings are partially centered and closed on the arbor by the separate shell as above explained, the arbor, with the rings firmly clamped in such condition, is inserted in the compressor and compressed air is admitted to the chamber 14 to the desired pressure. The nut 7 is then loosened whereupon the air in the chamber 14 extends the rubber tube 12 and forces the rubber strips 16 and the metal bars 17 inwardly, against the resisting tendency of the strips 16 to further compression, until the ends of the strips and bars rest upon the peripheries of the rings 8 as shown in Fig. 1. The steel bars thus axially align or center the rings, which are intended to be of such diameter that their gaps are closed by the bars 17 when in this position. In some instances, however, some of the rings are slightly smaller than others and with respect to those rings the rubber strips will be pressed somewhat farther inwardly between the steel bars, due to the pliability of these strips, so that the smaller rings can be contracted independently of the steel bars. After all of the rings have been centered and closed the nut 7 is screwed up tight so that the rings are held in their closed condition on the arbor. The arbor is then removed and placed in a lathe and the rings turned down to the proper diameter. When the rings are removed from the compressor the rubber strips 16 assume their normal condition and move themselves and the metal strips back into contact with the inner peripheries of the end rings 11.

Inasmuch as the rings are aligned axially and all of them are closed, it will be evident that each of the rings is turned in the lathe so that the finished rings are perfectly circular and concentric.

While I have shown in the drawings a preferred form of embodiment of my invention, it will be apparent that various changes may be made without departure from the spirit thereof.

I claim:

1. In a compressor for aligning and contracting objects, a flexible wall, and rigid bars and separate interposed flexible strips acted upon by said wall to align and contract the objects.

2. In a compressor for aligning and contracting objects, a tubular structure including rigid bars and interposed free-action flexible strips, and flexible means for acting upon said bars and strips so that the bars align the objects and the strips may independently contract the smaller objects.

3. In a compressor for compressing and aligning piston rings, a tubular structure comprising bars and interposed flexible strips, means for contracting said tubular structure, and means for limiting the contracting movement of said bars while permitting the strips to act individually on the piston rings.

4. In a compressor for compressing and aligning piston rings, a tubular structure comprising rigid bars and flexible means, means for contracting said tubular structure on the piston rings, and means for limiting the contracting movement of said bars.

5. In a compressor for compressing and aligning piston rings, a tubular structure comprising rigid bars and flexible means, a flexible wall subjected to fluid pressure for contacting said tubular structure on the piston rings, and circular members at each end of the tubular structure for limiting the contracting movement of said bars.

6. In a compressor for aligning and contracting piston rings, a tubular structure comprising spaced bars and interposed flexible strips compressed between the bars to normally maintain the tubular structure in extended condition, and means for contracting said tubular structure on the piston rings.

7. In a compressor for aligning and contracting piston rings, a tubular structure comprising spaced bars and interposed flexible strips compressed between the bars to normally maintain the tubular structure in extended condition, means for contracting said tubular structure on the piston rings, and circular members for limiting the contracting movement of the bars while permitting the strips to act individually on the piston ring.

8. In a compressor for aligning and contracting piston rings, a flexible cylindrical wall subjected to fluid pressure, a contractible tubular structure within the wall and comprising spaced longitudinally extending bars and compressed interposed flexible strips between the bars, the strips and bars being sustained in the tubular structure solely by the action of the flexible strips.

9. In a compressor for aligning and contracting piston rings, a flexible cylindrical wall subjected to fluid pressure, a contractible tubular structure within the wall and comprising spaced longitudinally extending rigid bars and compressed interposed flexible strips between the bars, the strips and bars being sustained in the tubular structure solely by the action of the flexible strips and means for limiting the inward movement of the bars.

10. In a tool for exerting closing pressure upon piston rings, the combination of an arbor and clamping rings for clamping the piston ring in assembly thereon, a cylinder, a flexible wall within the cylinder and forming an expansion chamber, and a tubular structure within the flexible wall and comprising rigid bars and flexible means, the clamping rings serving to limit inward movement of the bars.

11. In a tool for exerting closing pressure upon piston rings, the combination of an arbor and clamping rings for clamping the piston rings in assembly thereon, a cylinder, a flexible wall within the cylinder and forming an expansion chamber, a tubular structure within the flexible wall and comprising rigid bars and flexible means, the clamping rings serving to limit inward movement of the bars and means for preventing longitudinal movement of the tubular structure.

12. In a compressor for aligning and contracting piston rings, a cylinder, a cylindrical flexible wall within the cylinder subjected to fluid pressure, bars associated with said flexible wall, and means for limiting the inward movement of said bars so as to axially align the piston rings while permitting the rings to be individually acted upon to insure their closure.

In testimony whereof, I have subscribed my name.

CHARLES N. TEETOR.